United States Patent
Bharath et al.

(10) Patent No.: US 8,219,377 B2
(45) Date of Patent: Jul. 10, 2012

(54) MULTI-LAYER FINITE ELEMENT METHOD FOR MODELING OF PACKAGE POWER AND GROUND PLANES

(75) Inventors: Krishna Bharath, Atlanta, GA (US); Madhavan Swaminathan, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 324 days.

(21) Appl. No.: 12/710,991

(22) Filed: Feb. 23, 2010

(65) Prior Publication Data

US 2010/0217576 A1 Aug. 26, 2010

Related U.S. Application Data

(60) Provisional application No. 61/154,543, filed on Feb. 23, 2009.

(51) Int. Cl.
*G06F 17/50* (2006.01)
(52) U.S. Cl. .............. 703/14; 703/2; 716/109; 716/127; 716/133
(58) Field of Classification Search ............... 703/2, 13, 703/14; 716/104, 106, 109, 127, 132, 133
See application file for complete search history.

(56) References Cited

U.S. PATENT DOCUMENTS

| | | | |
|---|---|---|---|
| 6,188,582 B1 | 2/2001 | Peter | |
| 6,559,733 B2 * | 5/2003 | Larson et al. | 333/22 R |
| 6,657,130 B2 * | 12/2003 | Van Dyke et al. | 174/255 |
| 7,215,007 B2 * | 5/2007 | McKinzie et al. | 257/664 |
| 7,253,788 B2 * | 8/2007 | Choi et al. | 343/909 |
| RE41,001 E | 11/2009 | Oshima | |
| 7,626,216 B2 * | 12/2009 | McKinzie, III | 257/192 |
| 7,889,134 B2 * | 2/2011 | McKinzie et al. | 343/700 MS |
| 8,060,457 B2 * | 11/2011 | Kim et al. | 706/13 |
| 2006/0047490 A1 * | 3/2006 | Breiland et al. | 703/14 |
| 2008/0091389 A1 | 4/2008 | Kim | |
| 2008/0109773 A1 * | 5/2008 | Douriet | 716/5 |
| 2010/0180437 A1 * | 7/2010 | McKinzie, III | 29/825 |
| 2010/0205572 A1 * | 8/2010 | Dai et al. | 716/5 |

OTHER PUBLICATIONS

Wu, R.-B. Resistive Modeling of Periodically Perforated Mesh Planes in Multilayer Packaging Structures, IEEE Transactions on Components, Hybrids, and Manufacturing Technology, vol. 12, No. 3, 1989, pp. 365-372.*
Wu et al, K.-B. An Efficient and Flexible Modeling for Power/Ground Planes, 2006 IEEE Electrical Performance of Electronic Packaging, 2006, pp. 83-86.*

(Continued)

*Primary Examiner* — Russell Frejd
(74) *Attorney, Agent, or Firm* — Bryan W. Bockhop; Bockhop & Associates, LLC

(57) ABSTRACT

In a method for simulating electrical characteristics of a plurality of power planes, each power plane includes a plurality of geometric features. The geometric features of each power plane are projected onto a single planar construct. A polygonal mesh, including a plurality of pairs of interconnected nodes, that corresponds to the single planar construct is generated. The polygonal mesh is projected onto at least one power plane an equivalent circuit between each adjacent node of the plurality of interconnected nodes is projected onto the power plane. An equivalent capacitance is assigned between each node and a common ground planer. A finite element equation that includes a plurality of discrete terms is generated. The equation is solved, thereby determining the electrical characteristic value between each pair of adjacent nodes.

15 Claims, 3 Drawing Sheets

OTHER PUBLICATIONS

Wu et al, K.-B. Delaunay-Voronoi Modeling of Power/Ground Planes with Source Port Correction, IEEE Transactions on Advanced Packaging, vol. 31, No. 2, 2008, pp. 303-310.*

Liu et al, C. Analysis of Power-Ground Plane with Combination of Rectangle and Triangle Segmentation, APMC 2009 Asia Pacific Microwave Conference, 2009, pp. 2424-2427.*

Bharathy et al, K. Use of the Finite Element Method for the Modeling of Multi-Layered Power/Ground Planes with Small Features, 2009 Electronic Components and Technology Conference, May 26-29, 2009, pp. 1630-1635.*

Kim, Joong-Ho, "Modeling of Multilayered Power Distribution Planes Using Transmission Matrix Method" IEEE Transactions on Advanced Packaging, vol. 25, No. 2, May 2002.

Lee et al.; "Analysis of power delivery network constructed by irregular-shaped power/ground plane including densely populated via-hole"; Publication Year: 2005; Advanced Packaging, IEEE Transactions on; vol. 28, Issue: 2; pp. 168-173.

Wu et al.; "Composite effects of reflections and ground bounce for signal line through a split power plane"; Publication Year: 2002; Advanced Packaging, IEEE Transactions on; vol. 25 , Issue: 2; pp. 297-301.

Bharath et al.; "Efficient Simulation of Power/Ground Planes for SiP Applications"; Publication Year: 2007; Electronic Components and Technology Conference, 2007. ECTC '07. Proceedings. 57th; pp. 1199-1205.

Engin et al.; "Finite-difference modeling of noise coupling between power/ground planes in multilayered packages and boards"; Publication Year: 2006; Electronic Components and Technology Conference, 2006. Proceedings. 56th.

Pan et al.; "A combined finite difference and analytic expression approach to crossover capacitance in a multilayer dielectric environment"; Publication Year: 1996; Components, Packaging, and Manufacturing Technology, Part B: Advanced Packaging, IEEE Transactions on; vol. 19 , Issue: 3; , pp. 615-620.

Bharath et al.; "Computationally Efficient Power Integrity Simulation for System-on-Package Applications"; Publication Year: 2007; Design Automation Conference, 2007. DAC '07. 44th ACM/IEEE; , pp. 612-617.

Bushyager et al.; "Q-factor prediction and optimization of multilayer inductors for RF packaging microsystems using time domain techniques"; Publication Year: 2002; Electronic Components and Technology Conference, 2002. Proceedings. 52nd; pp. 1718-1721.

Horii et al.; "Super-compact multilayered left-handed transmission line and diplexer application"; Publication Year: 2005; Microwave Theory and Techniques, IEEE Transactions on; vol. 53 , Issue: 4 , Part: 2; pp. 1527-1534.

U.S. Appl. No. 11/888,705, filed Aug. 2, 2007 by Engin et al.—related case owned by common assignee.

U.S. Appl. No. 12/288,616, filed Oct. 22, 2008 by Han et al.—related case owned by common assignee.

* cited by examiner

MULTI-LAYER FINITE ELEMENT METHOD FOR MODELING OF PACKAGE POWER AND GROUND PLANES

CROSS-REFERENCE TO RELATED APPLICATION(S)

This application claims the benefit of U.S. Provisional Patent Application Ser. No. 61/154,543, filed Feb. 23, 2009, the entirety of which is hereby incorporated herein by reference.

BACKGROUND OF THE INVENTION

1. Field of the Invention

The present invention relates to electronic device modeling systems and, more specifically, to a system for modeling ground plains used in circuit boards.

2. Description of the Related Art

A high-performance digital or mixed signal system can contain thousands of signal lines that must be routed on several layers in the package and printed circuit board (PCB). These signal layers must be placed between or over power and ground planes in order to have an impedance controlled board including microstrip or stripline transmission lines. A power or ground plane also prevents any coupling of signal lines in an upper layer to signal lines in a lower layer. As a result of this, many power and ground layers have to be included in the stack-up. In order to reduce the parasitic effects of the power delivery network (e.g., to reduce the inductance of the planes), these layers can be allocated to power and ground in an alternating manner such that multiple plane pairs can exist in a package or board.

Power and ground planes in electronic packaging can be a major factor for noise coupling. There can be noise coupling not only in the transversal direction between two planes, but also in the vertical direction from one plane pair to another through the apertures and via holes. Excessive supply voltage fluctuations cause signal integrity (SI) problems. In addition, noise voltage that gets coupled to the edge of the board may cause significant electromagnetic interference (EMI). Hence, an accurate modeling of power/ground planes is critical to estimate the noise levels especially in mixed-signal systems where high isolation levels are required.

A solid plane made of a perfect conductor of infinite lateral dimensions would completely shield the fields on one side from the other side. Therefore, there would be no need to consider multiple plane pairs. In reality, however, planes at the same dc level have to be connected with vias to each other in order to reduce the effective inductance of the planes. Such a via has to go through a via hole in a plane having a different dc level in order to avoid a short circuit. Through this via and via hole, fields in different plane pairs get coupled to each other.

In addition, planes often have irregular geometries. There can be large apertures and splits in planes. Fields in different plane pairs can get coupled through these apertures. This can be regarded as a coupling by means of a wrap-around current on the edges of the planes. For narrow slots, a transmission-line-based model has been proposed to take into account this interlayer coupling. Electric and magnetic polarization currents have also been considered to compute the coupling through electrically small cutouts.

The field penetration through the conductors can be neglected for frequencies, where the skin depth is much smaller than the plane thickness. At lower frequencies, this field penetration has to be taken into account. For purposes of the description presented below, the thickness of the metal is assumed to be much larger than the skin depth. This assumption is valid above several megahertz for commonly used copper planes in packages.

Based on the finite-difference method (FDM), two equivalent circuit models for power and ground planes have been developed: T- and X-models. The multilayered FDM (MFDM) provides a simpler approach without any limit on the number of layers. It provides an accurate representation of wrap-around currents in complicated geometries, which have not been modeled before.

The multi-layered finite-difference method (M-FDM) is a finite difference-based technique that can solve power plane problems using square-meshes. The limitation of the method is that it uses a rigid, square, grid. Typically, package PDNs are electrically large. Thus, for a large solid plane, the square mesh used by MFEM can use a cell size that is dependent on the maximum frequency of simulation. A good rule of thumb is to use a discretization width of $\lambda/20$. However, these PDNs also contain geometrically small features such as split planes and apertures. To capture very fine structures, the regular mesh becomes dense locally and globally, resulting in a large number of unknowns.

In typical package geometries, the minimum feature size can easily be less that 100 μm or 4 mils. Thus for a 50 mm×50 mm package, the total number of cells required to model one solid plane-pair using a 100 μm cell size is 250,000. Although M-FDM has been demonstrated in its current implementation for a maximum of 1 million unknowns, this only allows for the modeling of four plane-pairs. Given that the feature size on package and board are shrinking to allow for greater wiring density, the mesh is a serious limitation of M-FDM.

It would be desirable to have methods and software that may be used to model multilayer planes and provide equivalent circuit models for such structures in which non-uniform meshes are used to model circuit equivalents in a power or ground plane.

SUMMARY OF THE INVENTION

The disadvantages of the prior art are overcome by the present invention which, in one aspect, is a method, operable on a digital computer coupled to a user interface, for simulating electrical characteristics of a plurality of power planes. Each power plane includes a plurality of geometric features. A routine for projecting the geometric features of each power plane onto a single planar construct is executed on the digital computer. A routine for generating a polygonal mesh, including a plurality of pairs of interconnected nodes, that corresponds to the single planar construct is executed on the digital computer. A routine for projecting the polygonal mesh onto at least one power plane of the plurality of power planes and generating an equivalent circuit between each adjacent node of the plurality of interconnected nodes projected onto the at least one power plane is executed on the digital computer. Thus, a plurality of equivalent circuits is generated. Each of the plurality of equivalent circuits describes an electrical characteristic of the at least one power plane in a region between each pair of adjacent nodes. A routine for assigning an equivalent capacitance between each node and a common ground plane is executed on the digital computer. A routine for generating a finite element equation that includes a plurality of discrete terms is executed on the digital computer. Each discrete term describes a different one of the plurality of equivalent circuits. A routine for solving the equation is executed on the digital computer. Thus, the electrical characteristic value between each pair of adjacent nodes in relation to an initial electrical property of the at least one power plane is determined. A routine for generating a human-perceptible indication of the electrical characteristic value between each pair of adjacent nodes of the at least one power plane is executed on the digital computer.

In another aspect, the invention is a digital computer coupled to a user interface and configured to simulate electrical characteristics of a plurality of power planes. Each power plane includes a plurality of geometric features. A projecting software module operable on the digital computer is configured to project the geometric features of each power plane onto a single planar construct. A mesh generating software module operable on the digital computer is configured to generate a triangular mesh, including a plurality of pairs of interconnected nodes, that corresponds to the single planar construct. A power plane projecting module operable on the digital computer is configured to project the triangular mesh onto at least one power plane of the plurality of power planes and is configured to generate an equivalent circuit between each adjacent node of the plurality of interconnected nodes projected onto the at least one power plane, thereby generating a plurality of equivalent circuits. Each of the plurality of equivalent circuits describes an electrical characteristic of the at least one power plane in a region between each pair of adjacent nodes. An assigning module operable on the digital computer is configured to assign an equivalent capacitance between each node and a common ground plane. A generating module operable on the digital computer is configured to generate a finite element equation that includes a plurality of discrete terms. Each discrete term describes a different one of the plurality of equivalent circuits. A solving module operable on the digital computer is configured to solve the equation so as to determine the electrical characteristic value between each pair of adjacent nodes in relation to an initial electrical property of the at least one power plane. An interface generating module operable on the digital computer is configured to generate a human-perceptible indication of the electrical characteristic value between each pair of adjacent nodes of the at least one power plane.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
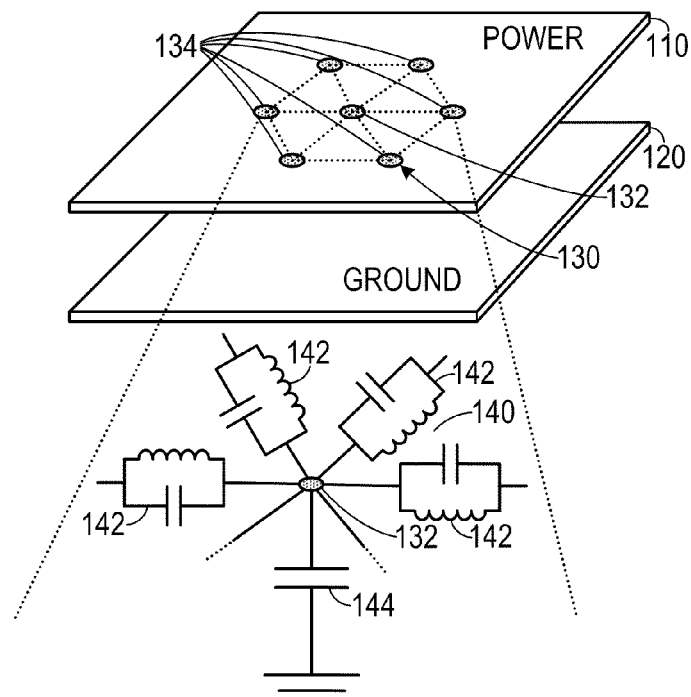
FIG. 1 is a schematic diagram showing an equivalent circuit that corresponds to a portion of a triangular mesh projected on a power plane.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

U.S. patent application Ser. No. 11/888,705, filed on Aug. 2, 2007 by Engin et al. discloses multilayered finite difference methods for electrical modeling of packages and printed circuit board and is, therefore, incorporated herein by reference. U.S. patent application Ser. No. 12/288,616, filed on Oct. 22, 2008 by Han et al. discloses modeling electrical interconnections in three-dimensional structures and is, therefore, incorporated herein by reference.

The present invention is directed to a multilayer finite element method (MFEM), in which a Delaunay triangular mesh is applied to each metal layer. The potential distribution on each plane-pair is expanded in terms of pyramid basis functions. On simplification, the obtained matrix equation can be shown to represent an electrical network. This development of a triangular mesh based finite element technique can be applied to multi-layer geometries. As only a surface mesh is required, this approach requires far fewer unknowns than a general 3D FEM-based solution.

Formulation for Single Plane-Pair Geometries

An efficient approximation that can be employed for package power planes is that of a planar circuit. A planar circuit is a microwave structure in which one of the three dimensions, say z, is much smaller than the wavelength. Under this condition, it can be assumed that the field is invariant along the z-direction. Hence, $$\frac{\delta}{\delta z} = 0$$

and the governing equation reduces to the scalar 2D-Helmholtz wave equation:

$$(\nabla^2 + k^2) = u = j\omega\mu d J_z, \quad \nabla^2 = \left(\frac{\delta^2}{\delta x^2} + \frac{\delta^2}{\delta y^2}\right) \tag{150}$$

where $\nabla^2$ is the transverse Laplace operator parallel to the planar structures, u is the voltage, d is the distance between the planes, k is the wave number, and $J_z$ is the current density injected normally to the planes. The open circuit at the boundary can be represented by a magnetic wall or Neumann boundary condition, which completes the problem formulation.

Using a standard finite-element approximation with a triangular mesh elements and linear pyramid or "hat" basis functions, the weak form of the PDE in Equation (150) is:

$$\sum_{j=1}^{N} \int\int_{\Omega} [\nabla \phi_j \cdot \nabla \phi_i + \omega^2 \mu\varepsilon \phi_j \phi_i + j\omega\mu dJ_2\phi_i]dxdy = 0 \quad (151)$$

where $\Omega$ is the problem domain. The formulation of the matrix equation for 2D geometries is well known. For convenience, simplex coordinates {L1,L2,L3} have been used, which can be related to the Cartesian coordinates:

$$x = L_1 x_1 + L_2 x_2 + L_3 x_3 \quad (152)$$

$$y = L_1 y_1 + L_2 y_2 + L_3 y_3 \quad (153)$$

$$L_1 + L_2 + L_3 = 1 \quad (154)$$

The equations above can be solved to obtain:

$$L_i = \frac{1}{2\Delta}(a_i + b_i x + c_i y) \quad (155)$$

$$a_i = x_{i+1} y_{i+2} - x_{i+2} y_{i+1}$$

$$b_i + y_{i+1} - y_{i-1}$$

$$c_i = x_{i-1} - y_{i+1}$$

and the subscripts are evaluated (modulo 3)+1. $\Delta$ is the area of the triangle with vertices at points (P1, P2, P3). Within the cell, the pyramid basis functions are identical to the simplex coordinates themselves. Hence, Equation (151) can be rewritten in matrix form as follows:

$$(\overline{K} + \overline{M})\overline{U} = \overline{F} \quad (156)$$

where, $\overline{K}$ and $\overline{M}$ represent the stiffness and mass matrices, respectively, $\overline{U}$ is the unknown potential, and $\overline{F}$ contains the contributions from the current source excitation.
The entries of $\overline{K}$, $\overline{M}$ and $\overline{F}$ are:

$$k_{i,j} = \int\int_{\Omega} \frac{j}{\omega\mu d} \nabla \phi_i \cdot \nabla \phi_j dxdy \quad (157)$$

$$m_{i,j} = \int\int_{\Omega} \frac{-j\omega\varepsilon}{d} \phi_i \phi_j dxdy \quad (158)$$

$$f_i = \int\int_{\Omega} J_z \phi_i dxdy \quad (159)$$

The linear pyramid basis functions are equal to the simplex coordinates within the cell, i.e.

$$\phi_1(L_1, L_2, L_3) = L_1 \quad (160)$$

Therefore, $$\nabla \phi_i = \nabla L_i = \frac{1}{2\Delta}(\hat{x} b_i + \hat{y} c_i) \quad (161)$$

Substituting Equation 161 in Equation 157, $$k_{i,j} = \frac{b_i b_j + c_i c_j}{4\Delta} \frac{j}{\omega\mu d} \quad (162)$$

The evaluation of the integral to obtain $m_{ij}$ (Equation 158) and $f_i$ (Equation 159) can be performed by transforming the coordinates from Cartesian to simplex using the Jacobian, $$dxdy = dL_1 dL_2 \frac{\delta(x,y)}{\delta(L_1, L_2)} = 2\Delta dL_1 dL_2 \quad (163)$$

The integrals in Equations 158-159 are a special case of the general formula where a; b and c are integer powers. Therefore, substituting a=2; b=0; c=0 when i=j and a=1; b=1; c=0 when i≠j, $$m_{i,j} = \frac{-j\omega\varepsilon}{d} \frac{\Delta}{12}(1 + \delta_{i,j}), \quad (165)$$

where $\delta_{i,j}$ is the Kronecker delta function.

Using a=1; b=0; c=0, $$f_i = J_z \frac{\Delta}{3} \quad (166)$$

Development of an Equivalent Circuit

As shown in FIG. 1, two separate planes, such as a power plane 110 and a ground plane 120 can be modeled with a triangular mesh 130 in which a plurality of nodes 132 and 134 are connected to form triangles. An equivalent circuit element 142 including an impedance value (which can include, for example, a capacitance and an inductance) can be assigned between each node 132 and each surrounding node 134. A capacitance 144 can also be assigned between each node 132 and the ground plane.

In such a equivalent circuit 140, $\overline{K}$ and $\overline{M}$ represent the admittance matrices of frequency-independent inductive and capacitive components, respectively. Specifically, $\overline{K}$ represents inductors connected between triangle vertices (i.e., along the triangle edges), and $\overline{M}$ represents capacitors connected between triangle vertices and to ground, as shown in FIG. 1. This can be shown by evaluating one row of the 3×3 local matrix corresponding to one triangle. For example, the sum of the first row of this matrix is:

$$S = \sum_{j=1}^{3} \frac{b_1 b_j + c_1 c_j}{4\Delta} \frac{j}{\omega\mu d}$$

Consider the b1bj term for j=1, 2, 3.

$$b_1^2 = (y_2 - y_3)^2 \text{ for } i=j=1$$

$$b_1 b_2 = (y_2 - y_3)(y_3 - y_1) \text{ for } i=1, j=2$$

$$b_1 b_3 = (y_2 - y_3)(y_1 - y_2) \text{ for } i=1, j=3$$

$$\therefore b_1^2 + b_1 b_2 + b_1 b_3 = 0 \quad (167)$$

Similarly, $c_1^2 + c_1 c_2 + c_1 c_3 = 0$ (168)

The other rows of the 3×3 local matrix also sum to zero. This implies that the rows (and by symmetry, the columns) of $\overline{K}$ sum to zero. This corresponds to circuit elements (in this case, inductances) connected between the triangle vertices, with no element to system ground. The row and column sums of $\overline{M}$ do not vanish, indicating capacitances to ground in addition to capacitive elements along edges.

Hence, the equivalent circuit for the single plane-pair case can be represented by the admittance matrix $\overline{Y}$, where $\overline{Y} = \overline{K} +$ M̄. This matrix is sparse and the solution to Equation (156) can be obtained using standard linear equation solvers well known to the art. The ability to obtain an equivalent circuit enables the extension of the method to multiple plane pair geometries, without the need for using 3D-mesh elements (i.e. tetrahedral or hexahedral).

Formulation for Multiple Plane-Pairs

As in the single plane-pair case, a triangular mesh is applied to each metal layer. The multi-layer formulation requires that the location of the mesh nodes be the same on every layer. This is done by flattening or collapsing the features on each metal layer on to one layer, on which triangulation is performed to obtain the mesh. The mesh thus obtained is used to discretize all layers.

Figure 2A:
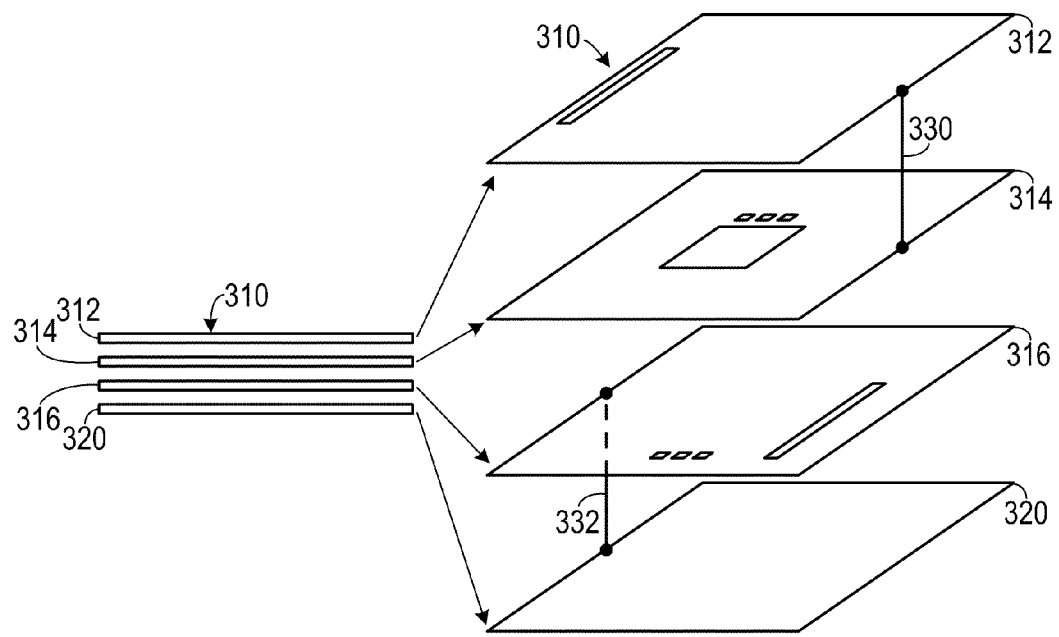
FIG. 2A is an expanded perspective view of three power planes and a ground plane.
Figure 2B:
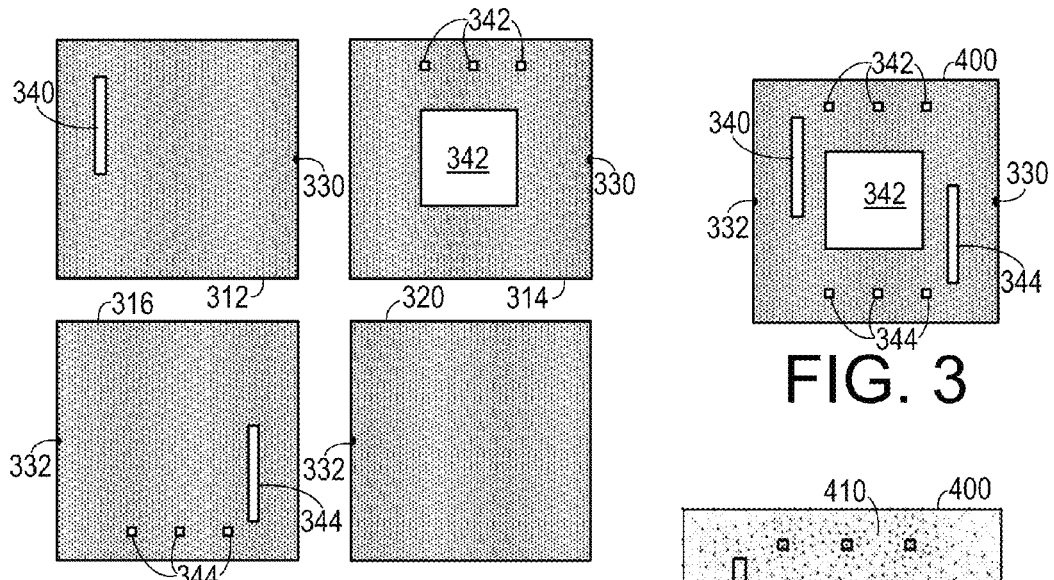
FIG. 2B is schematic view each of the planes shown in FIG. 2A.
Figure 3:
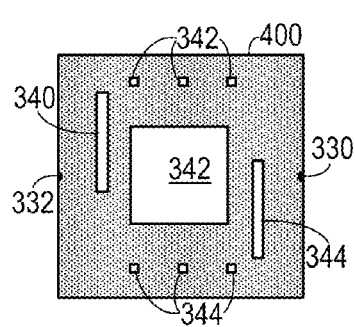
FIG. 3 is a schematic view of virtual plane onto which all of the features on the planes shown in FIGS. 3A-3B have been projected.

In one example shown in FIGS. 2A and 2B, a four-layer structure 310 includes four layers: a first metal layer 312, a second metal layer 314, a third metal layer 316 and a ground layer 320 (which is typically a metal layer). In this example, the first metal layer 312 includes an elongated aperture 340, the second metal layer 314 includes four square apertures 342, and the third layer includes four apertures 344 of different geometries. The first metal layer 314 is coupled to the second metal layer 330 by a common conductive port 330 and the third metal layer 316 is coupled to the ground layer 320 with a second conductive port 332. As shown in FIG. 3, all of the features on these layers can be projected onto a two dimensional shape 400 (also referred to as a "single planar construct"), that includes the outlines of all of the apertures and ports in the four layers 312, 314, 316 and 320.

Figure 4:
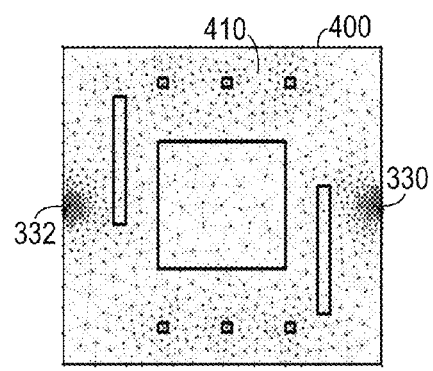
FIG. 4 is a triangular mesh that is laid over the virtual plane shown in FIG. 3.

As shown in FIG. 4, a triangular mesh 410 can then be applied to the planar construct 400 in which the nodes on the mesh tend to be denser around the nodes 330 and 332 and less dense in the void spaces of the apertures. This mesh can describe the geometrical features (polygon vertices and edges) in any of the layers. Generally, in the mesh, the nodes are relatively less dense in areas of the planar construct that are relatively more homogeneous electrically and are relatively more dense in areas of the planar construct that are relatively less homogeneous electrically. While use of a triangular mesh is disclosed in one example above, other types of polygonal meshes (e.g., rectangular) could be employed. In one embodiment, it is possible to combine elements of a triangular mesh with elements of a mesh including non-triangular polygons. In one embodiment, the triangular mesh is a Delaunay mesh.

For a multiple plane-pair structure containing more than two layers, it is possible to construct an equivalent circuit for each plane-pair. However, the equivalent circuits of different plane pairs assign their respective ground reference node to different layers. Therefore, to obtain a model for the multi-layered plane requires shifting the different reference nodes to one common ground.

Figure 5A:
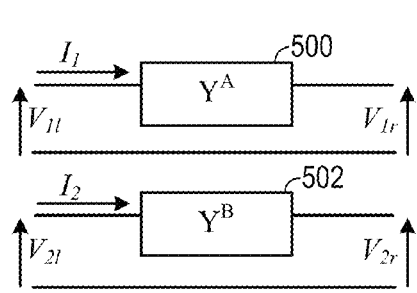
FIG. 5A is a schematic diagram showing two two-port networks with separate reference voltages.

This shifting of ground reference nodes can be done using indefinite admittance matrices. This is illustrated, without loss of generality, by using two-port networks 500 and 502 with separate ground references, as shown in FIG. 5A. The four-port admittance matrix for the system with the common reference node can be derived as follows:

$$Y_{11}^A V_{1l} + Y_{12}^A V_{1r} = I_1 \tag{169}$$

$$Y_{11}^B V_{2l} + Y_{12}^B V_{2r} = I_2 \tag{170}$$

Figure 5B:
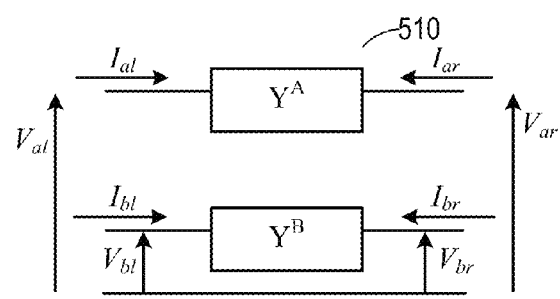
FIG. 5B is a schematic diagram of a combined four-port network with a common reference.

By noticing that $I_{bl} = I_2 - I_1$, $I_{al} = I_1$, $V_{1l} = V_{al} - V_{bl}$, $V_{1r} = V_{ar} - V_{br}$, $V_{2l} = V_{bl}$ and $V_{2r} = V_{br}$, it is possible to write one row of the admittance matrix of a combined four-port network 510, as shown in FIG. 5B.

$$Y_{11}^A (V_{al} - V_{bl}) + Y_{12}^A (V_{ar} - V_{br}) = I_{al} \tag{171}$$

A similar approach can be used to obtain the complete system in the following form:

$$\begin{pmatrix} Y^A & -Y^A \\ -Y^A & Y^A + Y^B \end{pmatrix} \begin{pmatrix} V_{al} \\ V_{ar} \\ V_{bl} \\ V_{br} \end{pmatrix} = \begin{pmatrix} I_{al} \\ I_{ar} \\ I_{bl} \\ I_{br} \end{pmatrix} \tag{172}$$

For an M+1-layer (M plane-pair) package with solid power/ground planes on each layer, the system matrix, $\overline{Y}$, is obtained as a simple extension of Equation 172.

$$\overline{Y} = \begin{pmatrix} Y_1 & -\overline{Y_1} & & & \\ -\overline{Y_1} & \overline{Y_1} + \overline{Y_2} & -\overline{Y_2} & & \\ & \ddots & \ddots & \ddots & \\ & & & & -\overline{Y_{M-1}} \\ & & & -\overline{Y_{M-1}} & \overline{Y_{M-1}} + \overline{Y_M} \end{pmatrix} \tag{173}$$

where $\overline{Y_i}$, i=1, 2, ..., M are admittance matrices obtained for the ith plane-pair counting from the top of the stack. The resulting matrix equation includes each discrete term in an arrangement corresponding to a spatial arrangement of each of the nodes. Solution of these matrices can be performed, for example, by using a numerical computing environment such as MATLAB, running on an appropriate digital computer.

Without apertures, the problem domain is simply a rectangle. In a more complex case with apertures, the flattened problem domain can be decomposed into a number of sub-domains, containing the solid metal planes and the apertures. To further explain this concept, an M+1-layer package with an arbitrary number of apertures on each layer can be flattened into a rectangular problem domain containing N sub-domains. Each of these sub-domains represents one aperture or many overlapping apertures. Thus, while adding the contributions of each layer i, i=1; 2; : : : ; M, to the admittance matrix, the following cases are considered. As before, i=1 is the top-most layer. 1. Sub-domains $j_1, j_2, ..., j_P$ correspond to no apertures on layers i and i+1: This case is handled as in the previous sub-section. The contributions of the sub-domains $j_1, j_2, ..., j_P$ are added to Yi without alteration. 2. Sub-domains $k_1, k_2, ..., k_Q$ correspond to apertures on layer i: The contributions of sub-domains $k_1, k_2, ... k_Q$ are removed from Yi. 3. Sub-domains $l_1, l_2, l_R$ correspond to apertures on layers i+1, i+2, ..., i+X: The contributions of sub-domains $l_1, l_2, ..., l_R$ are removed from $\overline{\overline{Y_i}}$. Create admittance matrix M containing the contributions of the excluded sub-domains, with reference to corresponding nodes in layer X+1.

Figure 6:
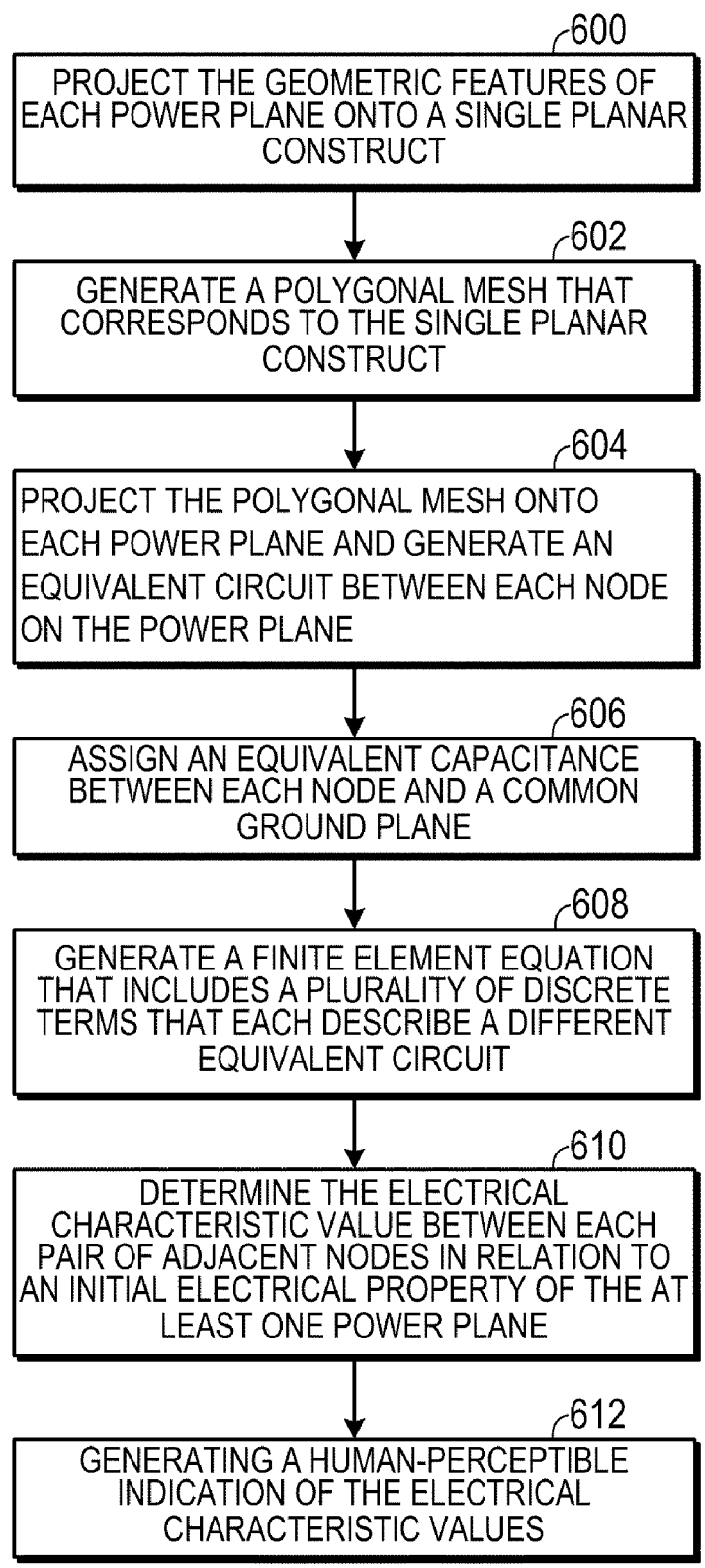
FIG. 6 is a flow chart showing one method of simulating the electrical characteristics of power planes and ground planes.

One method of performing simulations, according to the invention is shown in FIG. 6. This method is performed on a digital computer running a suitable numerical calculating environment, such as MATLAB. In the method, the geometric features of each power plane are projected 600 onto a single planar construct. A polygonal mesh is generated 602. The polygonal mesh includes a plurality of pairs of interconnected nodes and corresponds to the single planar construct. The polygonal mesh is projected 604 onto each power plane and generating an equivalent circuit between each adjacent node of the plurality of interconnected nodes projected onto each power plane. Thus, a plurality of equivalent circuits is generated. Each of the plurality of equivalent circuits describes an electrical characteristic of the at least one power plane in a region between each pair of adjacent nodes. An equivalent capacitance is assigned 606 between each node and a common ground plane. A finite element equation that includes a plurality of discrete terms is executed 608. In one example, the finite element equation can be solved by approximating a Helmholtz equation solution using commonly available numerical analysis tools. Each discrete term describes a different one of the plurality of equivalent circuits. The equation is solved and the electrical characteristic value between each pair of adjacent nodes in relation to an initial electrical property of the at least one power plane is determined 610. A human-perceptible indication of the electrical characteristic value between each pair of adjacent nodes of the at least one power plane is generated 612.

In one example of an experiment to validate the above-described method, a test case employed a four-layer structure of the type described in FIGS. 2A-2B, 3 and 4, with plane dimensions of 100 mm×100 mm. The difference in dimensions of each aperture was maximized to emphasize the meshing scheme employed by MFEM. Hence, the largest aperture size was 40×40 mm and the smallest was 3×3 mm. The minimum aperture size was chosen such that it still influenced the response of the structure at the maximum simulation frequency of 1 GHz. Two ports are placed between the bottom plane (ground) and the second plane, and between the third plane and the top plane, respectively. The dielectric used was FR-4 with ∈r=4:4. The structure was simulated with MFEM, which has been implemented using MATLAB, and the results were compared with the results of a similar MFDM analysis and a commercial power integrity simulator. The commercial tool performs 2.5-D simulation using FEM. A summary of the results with timing information and implementation details can be seen in the following table:

| METHOD | Number of Unknowns | Time per node | Code Used | Speed Advantage Resulting from Invention |
|---|---|---|---|---|
| MFEM | 3,594 | 0.350 s | MATLAB | — |
| MFDM | 122,411 | 5.6 s | C++ | 16 X |
| Commercial Tool | 71,204 | 2.0 s | Proprietary | 5.5 X |

The above-disclosed method, MFEM, preserves several advantages of M-FDM. These include a system that is sparse and a mesh that is applied only to the metal surfaces. Initial simulation results have demonstrated that MFEM requires significantly fewer unknowns while still providing accuracy comparable with other simulation methods. In the simulated examples, the MFEM problem size is roughly in the thousands of unknowns, whereas the number of unknowns in M-FDM was in the hundreds of thousands. This represents a reduction of around two orders of magnitude. MFEM has the potential to solve extremely large problems. Assuming that a maximum problem size of 500,000 unknowns (½ of M-FDM) can be solved using MFEM implemented with a direct solver, MFEM is capable of solving 50-500 layers. This is based on the assumption that each layer requires between 1,000 and 10,000 unknowns to discretize. A promising application of MFEM is in the simulation of multi-scale geometries or in the combined simulation of package and board.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method, operable on a digital computer coupled to a user interface, for simulating electrical characteristics of a plurality of power planes, each power plane including a plurality of geometric features, comprising the actions of:
   a. projecting the geometric features of each power plane onto a single planar construct;
   b. generating a polygonal mesh, including a plurality of pairs of interconnected nodes, that corresponds to the single planar construct;
   c. projecting the polygonal mesh onto at least one power plane of the plurality of power planes and generating an equivalent circuit between each adjacent node of the plurality of interconnected nodes projected onto the at least one power plane, thereby generating a plurality of equivalent circuits, each of the plurality of equivalent circuits describing an electrical characteristic of the at least one power plane in a region between each pair of adjacent nodes;
   d. assigning an equivalent capacitance between each node and a common ground plane;
   e. generating a finite element equation that includes a plurality of discrete terms, wherein each discrete term describes a different one of the plurality of equivalent circuits;
   f. solving the finite element equation so as to determine the electrical characteristic value between each pair of adjacent nodes in relation to an initial electrical property of the at least one power plane; and
   g. generating a human-perceptible indication of the electrical characteristic value between each pair of adjacent nodes of the at least one power plane.

2. The method of claim 1, wherein the action of generating an equation comprises generating a matrix equation that includes each discrete term in an arrangement corresponding to a spatial arrangement of each of the nodes.

3. The method of claim 1, wherein the action of generating a polygonal mesh comprises generating a triangular mesh.

4. The method of claim 3, wherein the triangular mesh comprises generating a Delaunay mesh.

5. The method of claim 1, wherein each equivalent circuit comprises an impedance value.

6. The method of claim 5, wherein the impedance value includes a capacitive component and an inductive component.

7. The method of claim 1, wherein the action of generating a polygonal mesh comprises generating a non-uniform triangular mesh in which the nodes are relatively less dense in areas of the planar construct that are relatively more homogeneous electrically and in which the nodes are relatively more dense in areas of the planar construct that are relatively less homogeneous electrically.

8. The method of claim 1, wherein the action of solving the finite element equation comprises the action of approximating a Helmholtz equation solution.

9. A system configured to simulate electrical characteristics of a plurality of power planes, each power plane including a plurality of geometric features, the system comprising:
- a digital computer coupled to a user interface and a memory, the memory storing program instructions executable by the digital computer to:
- a. project the geometric features of each power plane onto a single planar construct;
- b. generate a triangular mesh, including a plurality of pairs of interconnected nodes, that corresponds to the single planar construct;
- c. project the triangular mesh onto at least one power plane of the plurality of power planes and configured to generate an equivalent circuit between each adjacent node of the plurality of interconnected nodes projected onto the at least one power plane, thereby generating a plurality of equivalent circuits, each of the plurality of equivalent circuits describing an electrical characteristic of the at least one power plane in a region between each pair of adjacent nodes;
- d. assign an equivalent capacitance between each node and a common ground plane;
- e. generate a finite element equation that includes a plurality of discrete terms, wherein each discrete term describes a different one of the plurality of equivalent circuits;
- f. solve the finite element equation so as to determine the electrical characteristic value between each pair of adjacent nodes in relation to an initial electrical property of the at least one power plane; and
- g. using the user interface, generate a human-perceptible indication of the electrical characteristic value between each pair of adjacent nodes of the at least one power plane.

10. The system of claim 9, wherein the equation comprises a matrix equation that includes each discrete term in an arrangement corresponding to a spatial arrangement of each of the nodes.

11. The computer of claim 9, wherein the triangular mesh comprises a Delaunay mesh.

12. The computer of claim 9, wherein each equivalent circuit comprises an impedance value.

13. The computer of claim 12, wherein the impedance value includes a capacitive component and an inductive component.

14. The computer of claim 9, wherein the triangular mesh comprises a non-uniform triangular mesh in which the nodes are relatively less dense in areas of the planar construct that are relatively more homogeneous electrically and in which the nodes are relatively more dense in areas of the planar construct that are relatively less homogeneous electrically.

15. The computer of claim 9, wherein solving the finite element equation comprises approximating a Helmholtz equation solution.

* * * * *